Oct. 4, 1932.　　　H. F. CARTER　　　1,880,794
APPARATUS FOR PREPARING AND DISTRIBUTING MATERIAL
Filed Jan. 6, 1930　　　5 Sheets-Sheet 1

INVENTOR
H. F. CARTER
BY E. R. Nowlan
ATTORNEY

Oct. 4, 1932.  H. F. CARTER  1,880,794
APPARATUS FOR PREPARING AND DISTRIBUTING MATERIAL
Filed Jan. 6, 1930  5 Sheets-Sheet 2

Oct. 4, 1932.  H. F. CARTER  1,880,794
APPARATUS FOR PREPARING AND DISTRIBUTING MATERIAL
Filed Jan. 6, 1930  5 Sheets-Sheet 3

INVENTOR
H. F. CARTER
BY E. R. Nowlan
ATTORNEY

Oct. 4, 1932.   H. F. CARTER   1,880,794
APPARATUS FOR PREPARING AND DISTRIBUTING MATERIAL
Filed Jan. 6, 1930   5 Sheets-Sheet 4

Oct. 4, 1932.   H. F. CARTER   1,880,794
APPARATUS FOR PREPARING AND DISTRIBUTING MATERIAL
Filed Jan. 6, 1930   5 Sheets-Sheet 5

INVENTOR
*H. F. CARTER*
BY
*E. R. Nowlan*
ATTORNEY

Patented Oct. 4, 1932

1,880,794

UNITED STATES PATENT OFFICE

HERBERT F. CARTER, OF ROSELLE PARK, NEW JERSEY, ASSIGNOR TO WESTERN ELECTRIC COMPANY, INCORPORATED, OF NEW YORK, N. Y., A CORPORATION OF NEW YORK

APPARATUS FOR PREPARING AND DISTRIBUTING MATERIAL

Application filed January 6, 1930. Serial No. 418,978.

This invention relates to a method of and apparatus for preparing and distributing material, and more particularly to a method of and apparatus for preparing and distributing molten metal.

Certain types of electrical cables, particularly those employed for telephonic communication, are sometimes covered with a protective sheathing of lead or lead alloy, usually extruded thereon by means of extruding presses of a well known type. These extruding presses are sometimes supplied with the molten lead alloy by large melting pots or kettles, in which the desired proportions of lead, antimony, and other ingredients are melted and properly mixed. When a large number of these extrusion presses are employed in one manufacturing establishment, it has been found convenient and advantageous, in some instances, to arrange the presses side by side along a straight line. In such instances, it has been the practice heretofore to provide a separate melting kettle for each press or pair of presses, and to position the melting kettles closely adjacent to the presses which they are arranged to serve. This system of preparing and supplying the molten alloy requires a considerable amount of floor space as well as a large amount of manual labor in connection with the handling of the raw materials. Furthermore, it has been found that with the use of the above system of supplying the molten alloy, a considerable amount of care must be exercised in the mixing of the ingredients in the numerous separate kettles in order to insure the production of cable sheathing of the required uniform quality from all of the presses.

Objects of the present invention are to provide a simple and efficient method of and apparatus for preparing and distributing material.

One embodiment of the invention contemplates the provision, in connection with the manufacture of lead covered cables, of a simple and improved method and apparatus for preparing the molten lead alloy and for supplying it to the extruding presses. The molten alloy is prepared in a large central melting pot or kettle from which it is pumped into a central storage pot or kettle capable of serving all of the presses. The molten alloy is supplied to the presses through a conduit system consisting of interwelded sections of steel tubing which are heated so as to maintain the alloy at the required temperature by passing an electrical current through the wall of the tubing. The tubing is supported upon rollers and is thereby freely movable in response to the expansion or contraction due to variations in the temperature thereof.

It is believed that a clear understanding of the invention will be had from the following detailed description, when taken in conjunction with the accompanying drawings, in which.

Figures 1, 2:
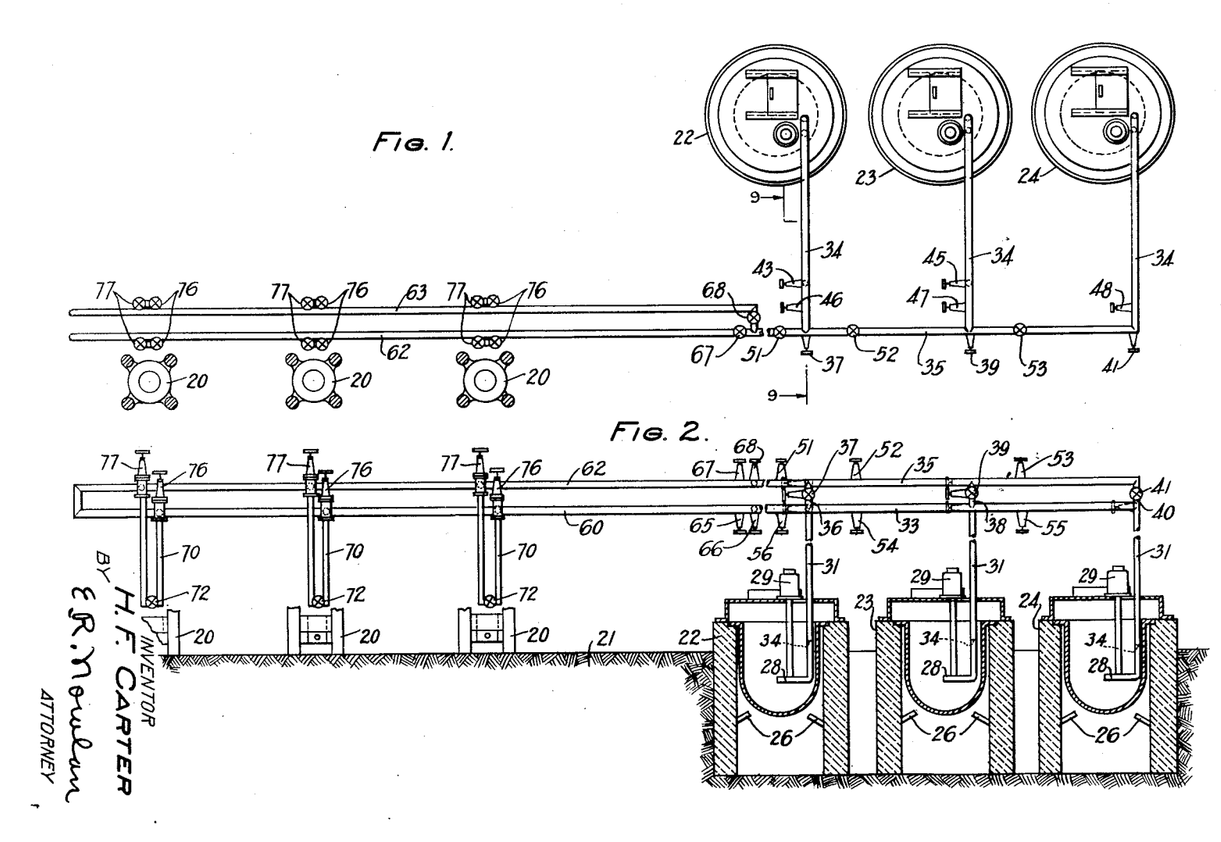
Fig. 1 is a plan view, somewhat schematic, of an apparatus embodying the features of the invention and by means of which the improved method may be practiced.
Fig. 2 is a schematic elevational view thereof, partly in section.

Referring now to the drawings, wherein like numerals designate corresponding parts throughout the several views, it will be observed that a series of extruding presses 20, 20, of the type employed in the extrusion of cable sheathing, are shown schematically in Figs. 1 and 2. These presses are preferably equidistantly spaced from each other along a straight line and are supported upon a common foundation or floor 21. In the present embodiment of the invention only three extruding presses are shown, although it is to be understood that the number of presses as well as the arrangement thereof may be varied as desired.

Spaced from the right hand end of the line of presses and to the rear thereof are a plurality of large tanks or kettles 22, 23 and 24, shown mounted in a common pit 25 (Fig. 2) formed in the floor 21. In the system herein disclosed, three of these kettles are provided, although it will be understood that a greater or lesser number may be employed if desired. Each of the kettles is provided with means, such as a plurality of gas burners 26, 26 for heating and maintaining the contents thereof at a predetermined temperature. Mounted in each of the kettles is an impeller type pump 28 which is driven by an electric motor 29 mounted above the kettle.

In order to insure a maximum flexibility of the system, the kettles 22, 23 and 24 are so arranged and interconnected by valved pipe lines that they may be used interchangeably either for preparing or for storing the molten alloy. Thus, it will be observed that each of the kettles are provided with a supply line 31 (Figs. 2, 9 and 11) through which the molten alloy is pumped out of the kettle. The kettle supply lines 31 are connected at one end to the impeller housing of the associated pump 28, and are all connected at their opposite ends to a common main supply line 33. The kettles are also each provided with a return line 34 through which the molten alloy may be pumped into a selected kettle, and the kettle return lines 34 are all connected to a common main return line 35, through which the unused molten alloy may be returned to either of the kettles. The kettle return lines 34 are also connected to the main supply line 33 in such manner that the molten alloy may be pumped from either of the kettles into either of the two remaining kettles, selectively. The supply and return lines 31 and 34 of the kettle 22 are interconnected at their junction with the main supply and return lines by a pipe line 36 having a valve 37 therein. The supply and return lines of the kettles 23 and 24 are similarly interconnected by pipe lines 38 and 40, provided with valves 39 and 41, respectively.

The supply line 31 of the kettle 22 is interconnected with the return line 34 thereof by a by-pass 42 provided with a valve 43. Likewise, the supply line 31 of the kettle 23 is interconnected with the return line 34 thereof by a by-pass 44 having a valve 45 therein. Valves 46, 47 and 48 are provided in the supply lines 31 of the kettles 22, 23 and 24, respectively. It will be noted that the valves 46 and 47 are located between the main supply line 33 and the by-passes 42 and 44, respectively. A valve 49 is provided in the return line 34 of the kettle 22 between the main return line 35 and the by-pass 42. Likewise, the return line 34 of the kettle 23 is provided with a valve 50 between the main return line 35 and the by-pass 44. The main return line 35 is provided with a valve 51 on the left side (Fig. 11) of the return line 34 of the kettle 22. A valve 52 is provided in the main return line 35 between the return lines 34 of the kettles 22 and 23 and another valve 53 is provided in the main return line 35 between the return lines 34 of the kettles 23 and 24. The main supply line 33 is provided with a valve 54 between the supply lines 31 of the kettles 22 and 23. Another valve 55 is provided in the main supply line 33 between the supply lines 31 of the kettles 23 and 24. A valve 56 is provided in the main supply line 33 on the left side (Fig. 11) of the supply line 31 of the kettle 22. It will be understood, of course, that the number of valves may be reduced considerably, if desired, by providing multi-way valves.

Figures 4, 5:
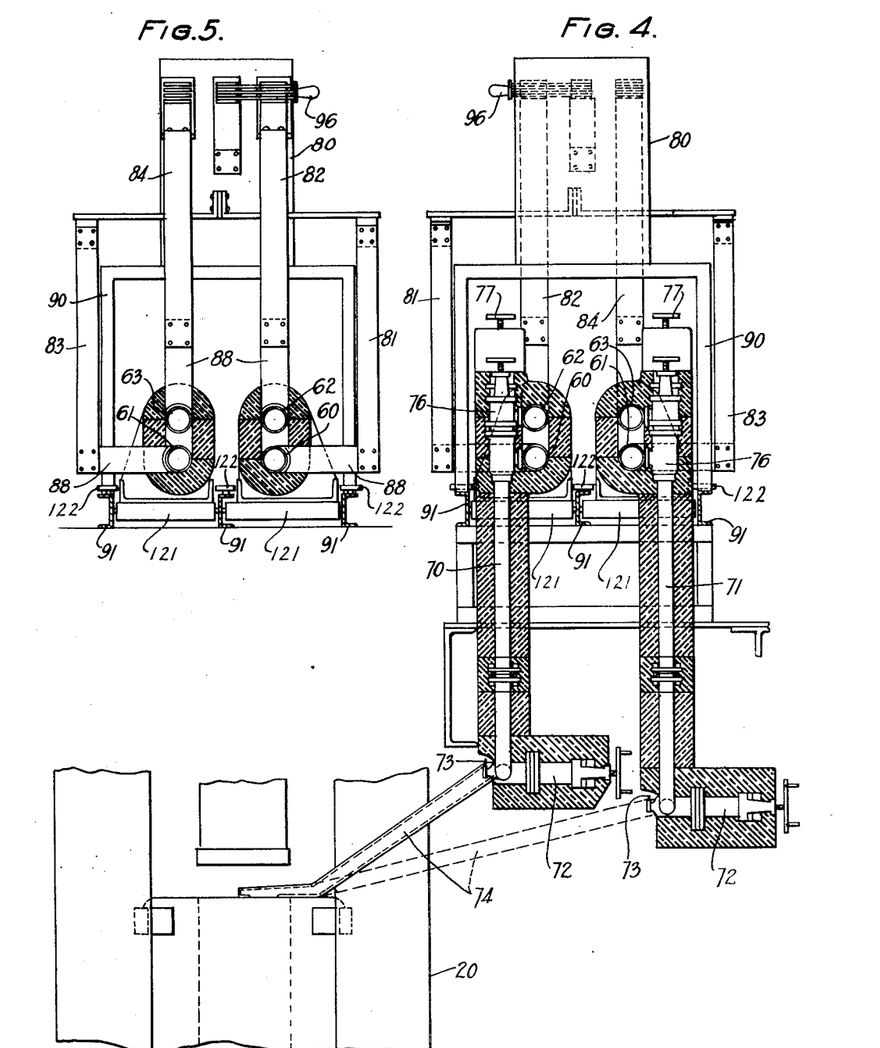
Fig. 4 is an enlarged fragmentary section on line 4—4 of Fig. 3.
Fig. 5 is an enlarged fragmentary section on line 5—5 of Fig. 3.
Figure 11:
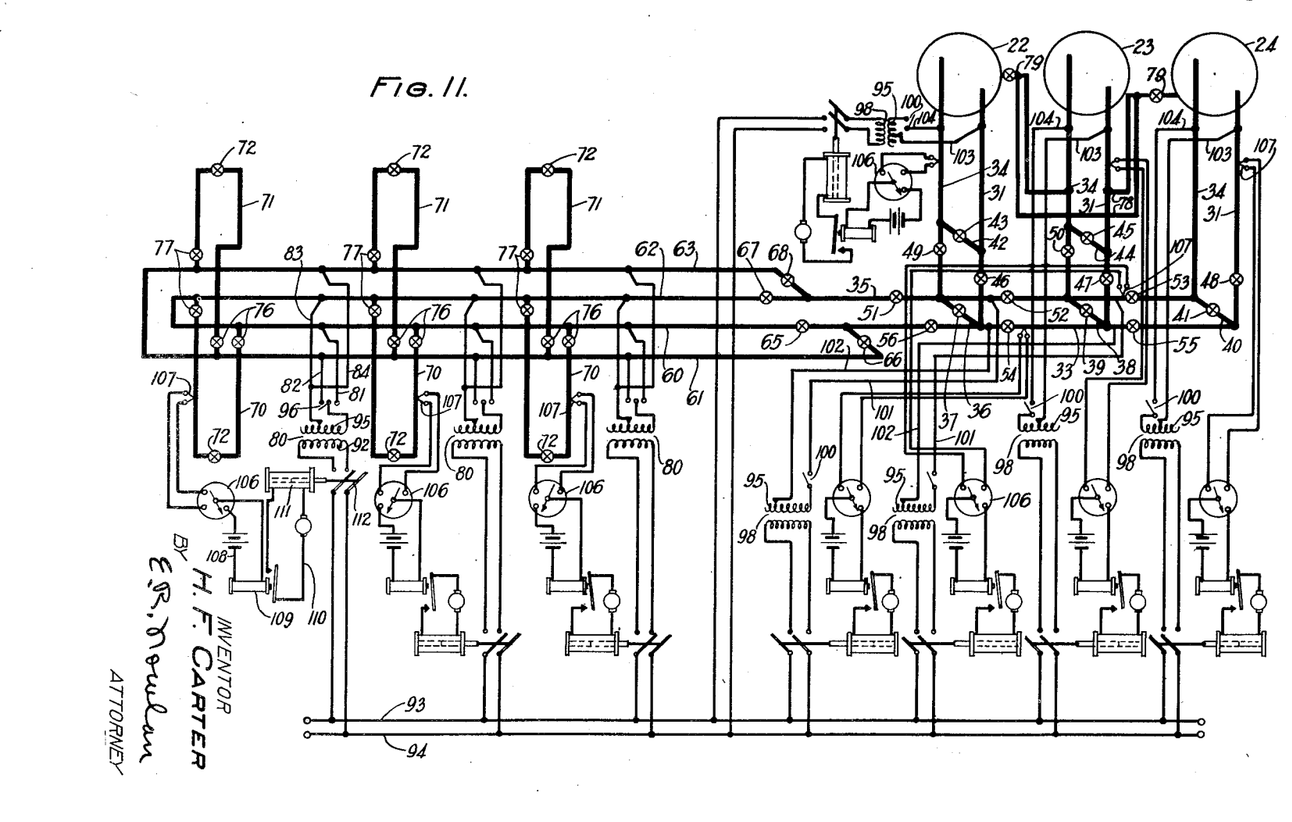
Fig. 11 illustrates, diagrammatically, the piping system and the electrical heating and control circuits therefor.

The main supply line 33 is connected to spaced duplicate supply lines 60 and 61 which extend horizontally along the rear of the entire line of presses (Figs. 2, 4 and 11). The main return line 35 is connected to spaced duplicate return lines 62 and 63 which extend horizontally, preferably directly above the supply lines 60 and 61, respectively. The supply lines 60 and 61 are connected at their outer ends to the return lines 62 and 63, respectively. Valves 65 and 66 are provided in the supply lines 60 and 61, respectively, near their junction with the main supply line 33, whereby the supply lines 60 and 61 may be used interchangeably for supplying the molten alloy to the presses. The return lines 62 and 63 are likewise provided with valves 67 and 68, respectively, near this junction with the main return line 35, whereby the return lines 62 and 63 may be used interchangeably in accordance with the particular supply line employed.

At each of the presses, the supply and return lines 60 and 62 are interconnected by a U-shaped branch line 70, and the supply and return lines 61 and 63 are similarly interconnected, at each press, by a branch line 71. Each of these branch lines or so called "downspouts" 70 and 71 is provided with a service valve 72 having means, such as a pin 73 (Fig. 4), for the attachment of a removable chute 74 for guiding the molten alloy into the cylinder of the press. It will be noted that the down-spout 71 projects slightly below the down-spout 70 so that the guide chute may be conveniently connected thereto, as shown in dotted outline in Fig. 4.

Each of the down-spouts 70 and 71 is provided with a valve 76 adjacent to its junction with the supply line and a valve 77 adjacent to its junction with the return line. By means of these valves, any or all of the downspouts may be readily disconnected from the supply lines. The down-spouts 70 and 71 are constructed so that the lower portion thereof containing the service valve may be readily removed. Thus, in the event of an obstruction or other trouble occurring in any of the service valves 72, the valves 76 and 77 may be closed and the lower portion of the down-spout containing the service valve may be readily and quickly replaced without interrupting the supply of the molten alloy to the other down-spouts.

The supply and return lines 31 and 34 of the kettle 23 may be interconnected by a branch line 78 (Fig. 11) having a portion extending to each of the kettles 22 and 24 provided with a valved outlet 79, through which the molten alloy may be transferred from the kettle 23 to either of the kettles 22 or 24 without interrupting the continuous circulation of the molten alloy through the service lines. In a similar manner, the supply and return lines 31 and 34 of the kettles 22 and 24 may be interconnected by suitable branch lines (not shown) whereby the molten alloy may be transferred from either of the kettles to either of the remaining kettles without interrupting the supply of the molten alloy in the service lines.

In order to insure a continuous flow of the molten alloy through the pipe lines and to maintain the alloy at a constant predetermined temperature, the pipe lines are heated, preferably by passing an electrical current through the walls thereof. For this reason, the pipe lines are composed of an electrical conducting material having a lower unit electrical resistance than the molten alloy. The pipe lines are preferably constructed of seamless steel tubing, with the valves and the individual sections thereof interwelded in such manner that a conduit system having a wall of substantially uniform thickness is provided.

The electrical current for heating the supply and return pipes 60, 61, 62 and 63 and the down-spouts 70 and 71 is supplied by a plurality of transformers 80, 80 connected to the pipe lines at spaced positions therealong. These transformers are so arranged and connected to the pipelines that each transformer is adapted to supply the required electrical current for heating a pair of adjacent down-spouts 70 and 71 and the interconnecting portions of the supply and return pipes. In order to provide for the expansion and contraction of the pipe lines due to variations in temperature thereof, the transformers are electrically connected thereto by laminated flexible conductors or copper bus bars 81, 82, 83 and 84 (Fig. 5) which permit a relative movement of the pipe lines with respect to the transformer. The bus bars are preferably attached to steel bars 88, 88 welded to the pipe lines.

Since the transformers 80 are all of the same type and are all connected to the pipe lines in the same manner, it is believed that the following detailed description of one of them will be sufficient to a complete understanding of the invention. As shown in Fig. 4, each transformer 80 is individually supported upon an inverted U-shaped bracket 90 attached to spaced horizontal channel supporting members 91—91. Referring now to Fig. 11, it will be observed that a primary winding 92 of the transformer 80 is connected in the usual manner to a source of electrical energy (not shown) through mains 93 and 94. A secondary winding 95 of the transformer is electrically connected to the pipe lines in such manner that the transformer may be employed interchangeably for heating either set of the duplicate supply and return lines. The supply pipes 60 and 61 are electrically connected intermediate the adjacent down-spouts 70 and 71 to oppositely disposed terminals of a double-throw switch 96 connected to one end of the secondary winding 95, the other end of which is connected to the return pipes 62 and 63. Thus, in one closed position of the switch 96, the electrical heating current is supplied to the supply and return pipes 60 and 62 and the adjacent pair of interconnecting down-spouts 70. In this instance, the secondary circuit of the transformer may be traced as follows:—From the secondary winding 95, through the switch 96, the conductor 81, the supply pipe 60, the adjacent down-spouts 70 on either side of the conductor 81, the return pipe 62, the conductor 83, and then back to the secondary winding 95. In another closed position of the switch 96, the electrical heating current is supplied to the supply and return pipes 61 and 63, in which instance the secondary circuit of the transformer may be traced as follows:— From the secondary winding 95, through the switch 96, the conductor 82, the supply pipe 61, the adjacent down-spouts 71 on either side of the conductor 82, the return pipe 63, the conductor 84, and then back to the secondary winding 95.

The electrical current for heating the main supply and return pipes 33 and 35 and the kettle supply and return lines 31 and 34 is supplied by a plurality of transformers 98 (Fig. 11) arranged and connected to the pipe lines in somewhat the same manner as described above in connection with the transformers 80. One transformer 98 is connected to the main supply and return pipes 33 and 35 at points equidistantly spaced from the interconnecting pipes 36 and 38. The secondary circuit of this transformer is completed by closing a switch 100, the current then passing from the secondary winding 95, through the switch 100, a flexible conductor 101, the main return pipe 35, the cross pipes 36 and 38, the main supply pipe 33, a flexible conductor 102, and back to the secondary winding 95. Another transformer 98 is connected to the main supply and return pipes 33 and 35 at points equidistantly spaced from the interconnecting pipes 38 and 40. The secondary circuit of this transformer is as follows:—From the secondary winding 95, through the switch 100, the flexible conductor 101, the main return pipe 35, the cross pipes 38 and 40, the main supply pipe 33, the flexible conductor 102, and back to the secondary winding 95. A transformer 98 is connected by flexible conductors or bus bars 103 and 104 to the supply and return pipes 31 and 34 of each of the kettles 22, 23 and 24. The secondary circuit of each of these transformers may be traced as follows:—From the secondary winding 95, through the switch 100, the flexible conductor 104, the return pipe 34, through the molten alloy in the associated kettle and the cross pipes interconnecting the supply and return pipes 31 and 34, the supply pipe 31, the flexible conductor 103, and back to the secondary winding 95. The primary windings 92 of the transformers 98 are connected in the usual manner to the mains 93 and 94.

In order to maintain the pipe lines at a substantially constant predetermined temperature, means is provided for controlling the electrical current supplied thereto by the transformers 80 and 98. This means may consist of a conventional pyrometer or contact closing galvanometer 106 associated with each of the transformers and controlled by thermocouples 107 attached to the pipe lines. When the temperature of the pipe lines drops below a predetermined limit, the galvanometer 106 is arranged to close an electrical circuit 108 which includes the winding of a relay 109. The relay 109, upon becoming energized closes an electrical circuit 110 including the winding of a solenoid 111 which is arranged to close a normally open switch 112 in the primary circuit of the transformer. After the pipe lines have been heated to the required temperature, the electrical circuit 108 of the relay 109 is opened by the galvanometer 106, whereupon the relay 109 opens the electrical circuit 110 of the solenoid 111, thus causing the de-energization of the solenoid and permitting the switch 112 to open either of its own weight or under spring tension (not shown).

Figures 3, 6, 7, 8:
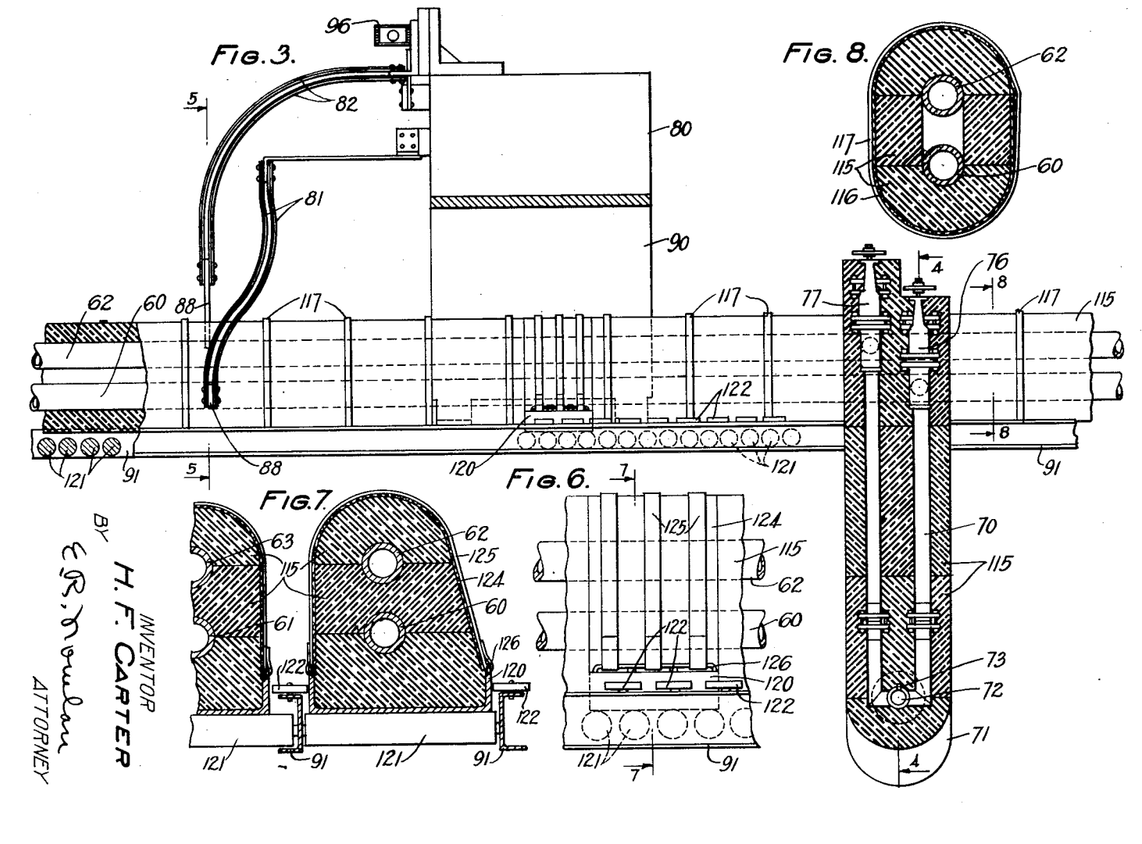
Fig. 3 is an enlarged fragmentary elevational view, partly in section, of a portion of the apparatus shown in Figs. 1 and 2.
Fig. 6 is an enlarged fragmentary elevational view of one of the pipe supporting cradles.
Fig. 7 is a fragmentary section on line 7—7 of Fig. 6.
Fig. 8 is an enlarged cross section on line 8—8 of Fig. 3.

The heat losses in the pipe lines are reduced to a minimum by covering all of the piping and valves with a thick layer of asbestos or other suitable insulating material 115. As shown in the drawings, particularly Figs. 3 to 10, inclusive, the heat insulating covering 115 is preferably composed of a plurality of complimentary sections of convenient lengths designed to be readily and conveniently attached to the pipe lines. A fiber outer covering 116 (Fig. 8) is provided for holding the individual sections of the insulation together and the whole is securely attached to the pipe lines by metallic bands 117, 117.

In accordance with a feature of the present invention, the pipe lines are all supported upon rollers in such manner that they are freely movable in response to the expansion or contraction thereof due to temperature changes. As shown in Figs. 3 to 8, inclusive, the supply and return lines 60 and 62 are attached to spaced U-shaped supporting channels or cradles 120 by means of a sheet metal covering 124 and metallic straps 125 secured to bars 126 welded to the flanges of the cradles. The cradles 120 are supported upon a plurality of rollers 121 journaled between spaced horizontal channel standards 91 at spaced intervals therealong. Rollers 122 arranged to engage the sides of the cradles 120 serve to reduce frictional resistance to a minimum. The rollers 122 are mounted in the upper flanges of the channels 91.

Figures 9, 10:
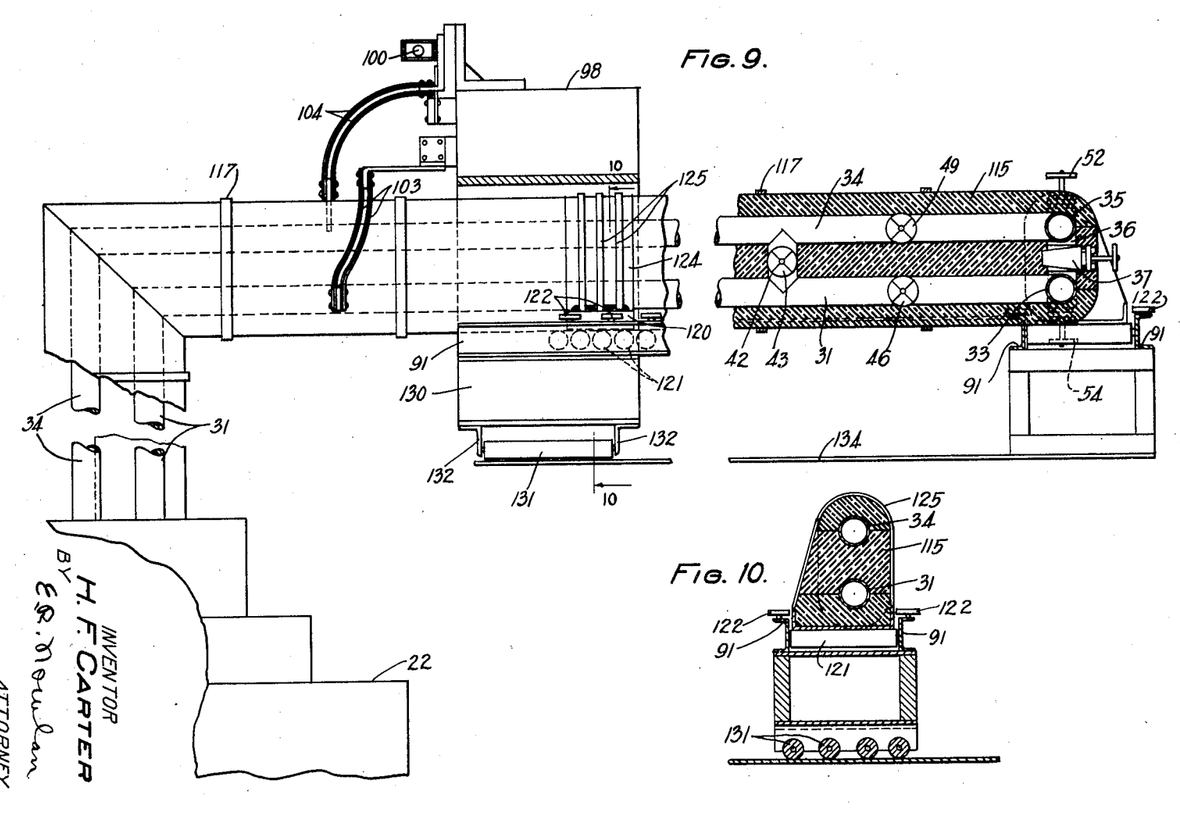
Fig. 9 is an enlarged fragmentary vertical section on line 9—9 of Fig. 1.
Fig. 10 is a vertical section on line 10—10 of Fig. 9.

The supply and return lines 61 and 63, the main supply and return lines 33 and 35, and the kettle return lines 31 and 34 are all supported upon movable cradles 120 in the same manner as described above in connection with the supply and return lines 60 and 62. Referring to Figs. 9 and 10, it will be noted that the supporting channels 91 of the kettle supply and return pipes 31 and 34 are attached, at spaced positions, to a framework 130 having spaced angle members 132—132 attached to the underside thereof. A plurality of spaced rollers 131, disposed at right angles to the rollers 121, are journaled between the angle members 132 and are arranged to engage a horizontal platform 134. By this construction the kettle supply and return pipes are movable transversely in response to the movement of the main supply and return pipes, and at the same time, are also movable longitudinally in response to the expansion or contraction thereof due to temperature changes.

In the operation of the above described apparatus, any two of the three kettles may be employed, one for melting and mixing the lead and antimony, or other ingredients, and the other for storing the prepared molten alloy and for supplying it to all of the presses. The third kettle is arranged so that it may be substituted for either the melting kettle or the storage kettle, and may be placed in service immediately should such emergency arise, as for example, when one of the kettles requires cleaning or repairing.

Assuming, for example, that the kettle 23 is to be used for preparing the molten alloy and the kettle 22 for storing the molten alloy and for supplying it to the presses, the operation of the improved system is started in the following manner:—The desired proportions of the raw materials or ingredients are deposited into the melting kettle 23, wherein they are melted and thoroughly mixed. After the pipe lines are heated to the required temperature, the valve 45 in the by-pass 44 is opened and the molten alloy is pumped out of the melting kettle 23 through the kettle supply pipe 31, the by-pass 44 and back into the melting kettle through the return pipe 34. This recirculation of the molten alloy in and out of the melting kettle insures a thorough mixing of the ingredients. When the molten alloy is properly mixed, the valve 45 is closed and the molten alloy is pumped from the melting kettle 23 through the kettle supply pipe 31 and the branch line 78 into the storage kettle 22.

After a sufficient quantity of the molten alloy has been pumped into the storage kettle 22, the valve 79 is closed and the valves 46, 56, 65 and 67 are opened. The valves 76 and 77 of the down-spouts 70 are also opened after insuring that the service valves 72 are closed. The molten alloy may now be continuously recirculated in and out of the storage kettle 22 and through a complete circuit of piping which may be traced as follows:— From the storage kettle 22 through the kettle supply pipe 31, the main supply pipe 33, the supply line 60 and down-spouts 70, the return line 62, the main return pipe 35, the kettle return pipe 34 and back into the storage kettle 22. At the same time, the supply of molten alloy in the storage kettle 22 may be replenished by pumping the molten alloy from the melting kettle 23, through the branch line 78 into the storage kettle. When desired, the supply and return lines 61 and 63 and the down-spouts 71 may be substituted in the system in place of the supply and return lines 60 and 62 and the down-spouts 70 by simply closing the valves 65 and 67 and opening the valves 66 and 68. When it is desired to load any of the presses 20 with a supply of the molten alloy, a guide chute 74 is connected to the service valve 72 of the associated down-spout, after which the service valve is opened and the molten alloy drawn therefrom in which the same manner as drawing water from a faucet.

From the above description, it will be obvious that the present invention provides a simple and improved method of and apparatus for economically and efficiently preparing and distributing molten metals, particularly lead alloys. It should be understood, however, that the invention is capable of other applications within the scope of the appended claims.

What is claimed is:

1. In an apparatus for preparing and supplying material, a plurality of receptacles, pipe lines interconnecting the receptacles comprising individual auxiliary supply and return branches located parallel with each other associated with each of said receptacles and a main supply branch and a main return branch located parallel with each other, and means including valves in the pipe lines and a pump associated with each receptacle whereby the recepatcles may be used interchangeably for preparing the material and for receiving and storing a supply thereof.

2. In an apparatus for preparing and supplying material, a plurality of receptacles, pipe lines interconnecting the receptacles comprising individual auxiliary supply and return branches located parallel with each other associated with each of said receptacles and a main supply branch and a main return branch located parallel with each other, means including valves in the pipe lines and a pump associated with each receptacle whereby material may be transferred from either of the receptacles to either of the remaining receptacles, and means for selectively electrically heating the supply and return branches associated with said receptacles and for selectively electrically heating different portions of said main supply and return lines.

3. In an apparatus for preparing and supplying material, a plurality of receptacles for containing the material, pipe lines interconnecting the receptacles, means including a pump associated with each receptacle whereby material may be transferred from either of the receptacles to either of the remaining receptacles comprising individual auxiliary supply and return branches located parallel with each other associated with each of said receptacles and a main supply branch and a main return branch located parallel with each other, means for selectively electrically heating portions of the pipe lines by passing an electrical current through the walls of selected sections of the pipes comprising said main supply and return branches and means comprising an electrical and heat insulator surrounding the auxiliary supply and return branches associated with each of said receptacles and surrounding said main supply and return branches.

4. In an apparatus for preparing and supplying molten metal, a receptacle for containing a supply of the molten metal, pipe lines extending from the receptacle and having branch lines depending therefrom for distributing the molten metal from the receptacle to a plurality of spaced stations, each of said branch lines comprising a supply and return pipe located parallel and adjacent to each other and joined together at one end to form a loop, means for electrically heating the pipe lines including a source of current and a transformer having leads therefrom connected to the ends of at least one of said loops for passing electrical current from said transformer through the pipe lines, and means for electrically and thermally insulating each of said loops as a unit.

5. In a system for distributing molten metal from a central point to a plurality of stations, an endless main conduit of electrical conducting material interconnecting the central point and the stations, a continuous looped branch conduit of electrical conducting material extending from the main conduit to each of the stations, and means for supplying electrical current to the main and branch conduits to heat them and thereby the metal therein, said means including a plurality of transformers, one of said transformers positioned adjacent the ends of at least one of said continuous looped branch conduits and connected thereto by means of short flexible conductors.

6. In a system for conveying molten metal, a continuous conduit of electrical conducting material for conveying the metal therethrough, a source of electrical current, a plurality of transformers, means including flexible electrical conductors for connecting the transformers with the conduit to heat it and thereby the metal therein, automatic regulating means associated with said transformers for maintaining the temperature of said metal at a predetermined selected value, and a roller conveyor for supporting the conduit and permitting a longitudinal movement thereof due to its expansion and contraction caused by changes in the temperature thereof.

7. In a system for conveying heated matter from a first to a second point, main supply and return conduits extending from the first point to the second point, an electrical and heat insulator surrounding the main supply and return conduits as a unit, a roller platform for supporting the insulated conduits as a unit, and branch supply and return conduits connected to the main supply and return conduits at the second point and supported by said main conduits independently of the platform.

8. In an apparatus for conveying material, supply and return conduits for conveying the material therethrough, an electrical and heat insulator surrounding said conduits as a unit, and a roller platform for supporting the conduits as a unit to permit movement thereof due to the longitudinal expansion and contraction caused by changes in the temperature thereof.

In witness whereof, I hereunto subscribe my name this 24th day of December A. D., 1929.

HERBERT F. CARTER.